United States Patent

[11] 3,627,945

[72] Inventors Ernst Diggelmann; Rudolf Kuhne, both of Berne, Switzerland
[21] Appl. No. 773,800
[22] Filed Nov. 6, 1968
[45] Patented Dec. 14, 1971
[73] Assignee Hasler, AG Berne, Switzerland
[32] Priority Nov. 16, 1967
[33] Switzerland
[31] 15931/67

[54] TRANSMISSION OF ASYNCHRONOUS TELEGRAPHIC SIGNALS
2 Claims, 5 Drawing Figs.

Figure 1:
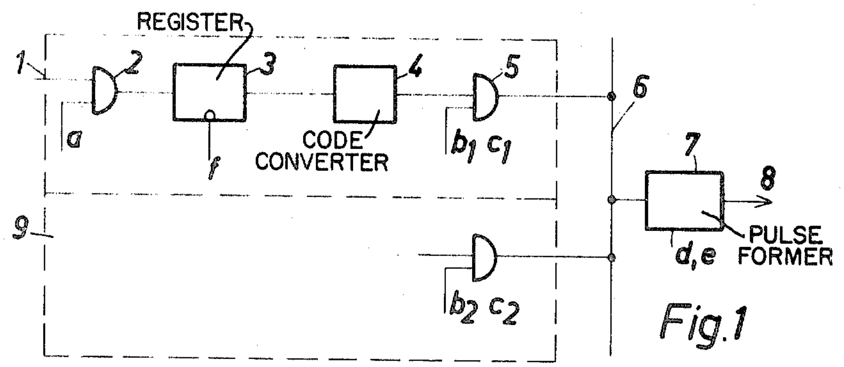

[52] U.S. Cl. .......... 178/50
[51] Int. Cl. .......... H04l 3/00
[50] Field of Search .......... 179/15 BS, 15 AP, 15 BA, 15 AE, 15 BW; 325/38 A

[56] References Cited

UNITED STATES PATENTS

| | | | |
|---|---|---|---|
| 2,996,578 | 8/1961 | Andrews | 325/38 A |
| 3,048,819 | 8/1962 | Helder et al. | 179/15 AE |
| 3,133,280 | 5/1964 | Crater | 325/38 A |
| 3,414,677 | 12/1968 | Quinlan | 325/38 A |
| 3,042,751 | 7/1962 | Graham | 179/15 BS |
| 3,126,537 | 3/1964 | Trampel | 325/38 A |
| 3,230,310 | 1/1966 | Brogle | 325/38 A |
| 3,241,135 | 3/1966 | Kuflic | 179/15 AP |
| 3,492,432 | 1/1970 | Schimpf | 179/15 AP |

OTHER REFERENCES

The Lenkurt Demodulator, Vol. 12, No. 2, Feb. 1963, " Duobinary Coding,"

*Primary Examiner*—Kathleen H. Claffy
*Assistant Examiner*—David L. Stewart
*Attorney*—Brady, O'Boyle & Gates ABSTRACT: In transmitting telegraphic signals, binary asynchronous signals are scanned at regular intervals and combined to form scanning groups, each of which is converted to a code word. The data contained in the code word is then transmitted via a telegraphy channel to the receiving end of the line where it is converted to a binary time-quantitized output signal. The circuit for performing these operations has a transmitter part and a receiver part. The transmitter part has a master clock, for transmitting different pulse series for controlling the scanning and transmission, a channel unit for scanning the signal and a code converter for converting the scanning group into a code word. The receiver part has a master clock synchronized by the received signals, a counter for counting pulses corresponding to the scanning pulses and an output flip-flop.

Inventors
ERNST DIGGELMANN
RUDOLF KÜHNE
BY Brady, O'Boyle & Gates
ATTORNEYS

TRANSMISSION OF ASYNCHRONOUS TELEGRAPHIC SIGNALS

The invention relates to a method for the transmission of binary asynchronous signals via a synchronous channel.

Synchronous methods are increasingly employed for the transmission of telegraphic signals because the transmission rate is higher, the error probability is lower and there is moreover a possibility of multiple transmission in accordance with the time multiplex system.

In synchronous transmission the signed elements are of equal length and follow in uninterrupted sequence. One bit is transmitted with each signed element.

Asynchronous, binary signals may assume two different values and may alternate therebetween at any desired moment of time but two successive alternations have a minimum interval, referred to as asynchronous signal element time.

The invention is characterized by the following process phases:

The asynchronous signals are scanned at regular intervals and the result of each scanning cycle may be either 1 or 0.

Every $p$ successive scanning results of the same signal are combined to a scanning group comprising $p$-bits, $p$ being less than the number of scanning cycles per character element of the asynchronous signal.

Each scanning group is code-converted into a code word related thereto and being dependent on the first element of the scanning group and on the number of elements of a specific kind.

The data contained in the code word is transmitted via a synchronous channel.

The received synchronous signal is converted into a binary time-quantitized output signal, every $p$ interval corresponding to each code word and, with the exception of the distortion caused by time quantitization the output signal corresponds to the input signal during the $p$intervals.

The required scanning frequency is determined by the maximum permissible distortion time while the minimum permissible number of scanning cycles for the shortest signal element of the asynchronous signal is determined by the relative distortion. For example, given a telegraphing rate of 200 Baud and a maximum permissible individual distortion of 312.5$\mu$sec., corresponding to an isochronous distortion of 12.5 percent, the scanning frequency must be at least 1,600 pulses/sec.; there are eight scanning cycles for each asynchronous signal element.

The following possibilities will then apply to the scanning group: everything 0, everything 1, $n$-ones followed by $p$-$n$zeros, $p$-$n$-zeros followed by $n$-ones. In the last two cases the first bit is identical to the last bit of the preceding scanning group because at least $p$-bits will be disposed between two changes. The conversion of the scanning results into code words will therefore provide $p$+1 different code words which are then transmitted after multiplexing where appropriate and further conversion.

The prior art in particular discloses a synchronous binary transmission system which serves for the transmission of telephony by means of pulse code modulation and is described on pages 43–52 of Hasler Mitteilungen, 1966. In the conversion of analog telephony signals into the telegraphic digital signals to be transmitted by this method the code words are first generated in a ternary code and each element of said code is then transmitted as a dibit (bit pair), the dibit 01 being associated with one ternary number, the dibit 10 being associated with a second ternary number, while the dibits 00 and 11 are associated with the third ternary number. The two last-mentioned dibits are therefore equivalent in terms of data; of these dibits one is so selected that the dibits 00 and 11 alternate on the transmission path without reference to dibits 01 and 10 disposed therebetween. The disparity of this code, that is to say the difference of zeros and ones is smaller or equal to two for any given word length; moreover, at no time is it possible for more than four ones or four zeros to follow successively. These two properties as well as the bivalence of the transmitted signal substantially simplify the construction of intermediate amplifiers. The alternation of the dibits 00 and 11 refers to the transmission path and not to the individual channel; the decision as to whether 00 or 11 is to be set for the third ternary number may therefore be made only after multiplexing.

A special embodiment of the method according to the invention utilizes the transmission channels of such a pulse code modulation system for the transmission of binary asynchronous signals in that a code word, comprising $q$ ternary elements is associated with each scanning group comprising $p$elements, where $3^q-1 > p$, these code words being transmitted in the stated manner as dibits.

Figure 2:
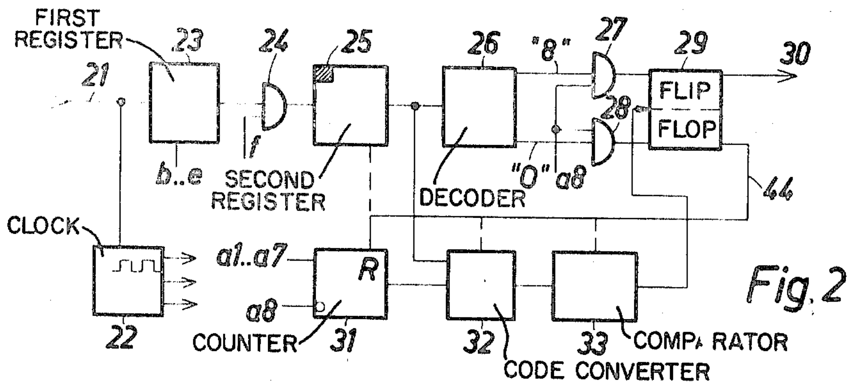
Figure 3:
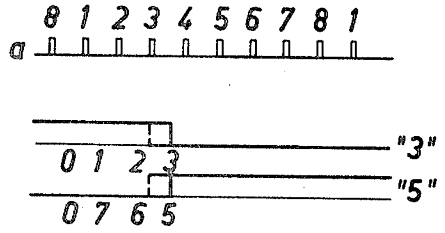
Figure 4:
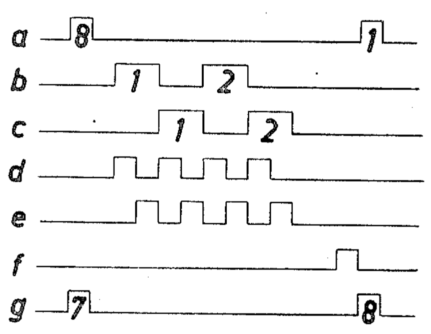
Figure 5:
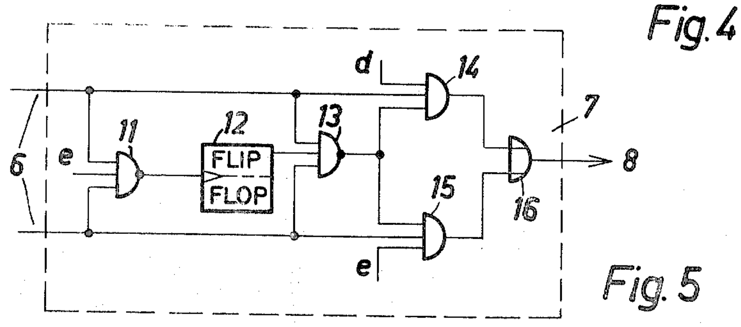

An exemplified embodiment of the invention is explained hereinbelow by reference to the drawing, in which:

FIG. 1 is a block circuit diagram of apparatus for converting an asynchronous signal into a synchronous signal, FIG. 2 shows means for the reconversion of the synchronous signal into an asynchronous signal, FIG. 3 shows pulses in diagrammatic form for explaining the method of operation of the system, FIG. 4 shows a further pulse diagram to an enlarged time scale, FIG. 5 shows a circuit for converting dibits in the transmitter.

In FIG. 1, the asynchronous signals arriving on conductor 1 are scanned by the pulses $a$ occurring at regular intervals as indicated in FIG. 3, by means of the AND-gate 2, the scanning result being stored in the register 3. In the simplest case the aforementioned register is a counter which is set to zero prior to the beginning of a scanning group and counts the number of ones obtained by scanning. It may be assumed hereinbelow that $p$=8 scanning results are combined into one scanning group; at the end of a scanning group it is therefore possible for the counter to be set in any one of the positions 0 to 8. To each of these 9 different positions, designated with "0" to "8" to a different code word is assigned comprising two ternary numbers represented by the dibits 01, 10, 11. The counter output signal is converted into the corresponding code word by the code converter 4 unless the counter itself produces the corresponding code word. After eight scanning pulses $a$ have elapsed, the code word is transmitted by the pulses $b1$ and $c1$, as indicated in FIG. 4, to the pulse former circuit 7 via the multiplex bus 6 comprising two conductors and by means of a circuit 5 comprising a plurality of AND-gates, one bit each of a dibit being transmitted via one of the two conductors. The signal is transferred to the conductor 8 from the circuit 7 which is driven by the pulse $d$ and $e$. A buffer register must be provided between the code converter 4 and the pulse former circuit 7 if it is not possible for transmission to occur before the next pulse $a$.

The pulse former circuit indicated in FIG. 5 converts every second dibit 11 into a dibit 00 while the dibits 01 and 10 remain unchanged. During the period $b1$ or $c1$ respectively the upper conductor of the bus 6 will carry the first and the lower conductor the second bit of the first or second dibit respectively said bits being transmitted successively to the output conductor 8 via the AND-gates 14 and 15 and via the OR-gate 16. The pulse $d$ occurs during the first halves, the pulse $e$ occurring during the second halves of the pulses $b1$ , $c1$ and further pulses $b2$, $c2$, $d3$, $c3$ and the like. If the state of only one of the conductors 6 is equal to 0, that is to say when the dibits 01 and 10 occur, the output of the NAND-gate 13, whose output is connected with one input each of the AND-gates 14 and 15 respectively, is set to 1 and transmission takes place without interruption via said AND-gates.

The two conductors 6 are also connected to the inputs of a NAND-gate 11 to whose third input the pulse $e$ is applied. The output of the NAND-gate 11 will be set to 0 only if both bus bars are at the potential 1 and only for the duration of the pulse $e$. The aforementioned output is connected to the trigger input of the flip-flop 12 which reverses whenever the trigger input changes from 0 to 1, an event which can occur only at the end of a period $e$. If the flip-flop 12 is set to 1 and therefore its output which is connected to the input of the NAND-gate is also set to 1 and if moreover both bus bars are also at potential 1, a zero potential will occur at the output of the NAND-gate 13 and both AND-gates 14 and 15 will be blocked. The dibit 00 will therefore appear instead of 11 at the output of said gates when every second dibit 11 occurs on the bus bars because the flip-flop 12 is reversed at the end of each dibit 11 on the bus bars so that said flip-flop 12 alternately admits and blocks the dibits 11 which appears on the bus bars.

The code converter described hereinabove is common for all subchannels of the pulse modulation transmission channel. Synchronous telegraphy channels or pulse code modulation channels may be switched on to the bus bars in addition to the asynchronous telegraphy channels described hereinabove.

FIG. 2 illustrates a circuit designed to convert in the receiver the pulses arriving on the synchronous channel into an output signal corresponding to the asynchronous input signal. The synchronous signals arrive on conductor 21. A master clock 22 produces from said signals in known manner the timing pulses *a–f*, corresponding to the timing pulses of the same designation in the transmitter. The pulse *a*8 in the receiver is delayed relative to the pulse *a*8 in the transmitter by at least the duration of the transmission time. The circuit 23, driven by the pulses *b–e*, receives the code word and after completed recording transfers said code word at the moment of time of the pulse *f* via the AND-gate circuit 24 to the register circuit 25. The circuit 23 is reset to zero and is then ready for the reception of the next synchronous signal. The register circuit 25 has connected to it a decoder 26 which sets the flip-flop 29 into position 1 at the time *a*8 and via the AND-gate 27 for the signal "8" which corresponds to one scanning group which contains only ones so that the signal 1 also appears on the output conductor 30 which is connected to the flip-flop. The flip-flop 29 is set in corresponding manner at the time *a*8 and via the AND-gate 28 to 0 for the "0" signal which corresponds to a scanning group containing only zeros, whereupon a 0 will appear at the output 30.

For the other code words 1 to 7 it is necessary for the output flip-flop 29 to be reset during the signal period. To this end and at the beginning of the time corresponding to the scanning group a counter 31 is set to zero by the pulse *a* 8 and is indexed by the pulses *a*1 –*ay* which correspond to the scanning pulses. The position of the counter 31 is compared with the contents of the register 25 by means of a comparator circuit 33. The counter either counts in the code in which the code word is expressed in the register 25 or a code converter 32 provides code matching between the register 25 and the comparator circuit 33 or between the counter 31 and the comparator circuit 33. As soon as the counter has reached the position corresponding to the change of bit in the scanning group, the comparator circuit will deliver a signal which switches the flip-flop 29 so that the output signal on conductor 30 is altered accordingly.

Since the code word corresponds to the number of ones found during scanning in accordance with the circuit illustrated in FIG. 1, the comparison must be performed differently depending on whether the first bit of the interrogation group is 1 or a 0. When neither the signal "0" nor the signal "8" appear, the first bit of the present scanning group which cannot be recognized from the transmitted code word, will be equal to the last bit of the precedingly transmitted scanning group and is determined by the position of the flip-flop 29. If the aforementioned flip-flop is set to 1, the comparator circuit will be rendered operative if the position of the counter 31 is equal to the number of detected ones; however, if the flip-flop 29 is set to 0, the comparator circuit will be rendered operative if the counter position is equal to the number of detected zeros. This is achieved by a conductor 44 extending from the flip-flop 29 and adapted to reverse the counting direction of the counter 31 so that said counter counts in the reverse direction from the position 0=*p*. However, the register 25 or the code converter 32 or the comparator circuit 33 may be driven in the reverse direction by means of the control signal on the conductor 44, another embodiment indicated by the conductors shown in broken lines. Under these circumstances it is appropriate if the counter for the position *p–n* provides a code word which is the inverse of that obtained for position *n*.

FIG. 3 shows in the first line the scanning pulses *a*, the second line shows an asynchronous signal which changes from 1 to 0 between the third and fourth scanning pulse so that the three first bits of the scanning group are equal to 1 and the others are equal to 0 while the code word "3" is transmitted. The comparator circuit is rendered operative on the arrival of the pulse 3. The appropriate position of the counter 31 is indicated below the signal. In the third line and after the third scanning pulse the asynchronous signal changes from 0 to 1 and the code word "5" is transmitted. The counter counts in the reverse direction from the basic position and the comparative circuit is once again rendered operative on the arrival of the third pulse. In both cases the flip-flop 29 will be reversed on the arrival of the third pulse but in a different direction. The output signal is illustrated in broken lines. The output signal 30 is therefore equal to the input signal on conductor 1 with the exception of the distortions due to the time quantitization.

FIG. 4 shows in the first line the scanning pulses *a* in the transmitter, in the second to sixth line the pulse *b–f* which occur simultaneously in the transmitter and receiver, apart from the transit time on the conductor, and the last line indicates the pulses *a* in the receiver which occur simultaneously with the *a*-pulses in the transmitter but whose numbering is shifted by one scanning step.

If a plurality of asynchronous telegrams are transmitted over the same synchronous channel by being time-multiplexed with each other or with pulse code modulation telephony channels, it is possible for the master clock 22, the recording register 23, the counter 31 and the code converter 32 in FIG. 2 to be common to all telegraphy channels if these operate at the same scanning frequency. A further buffer register will have to be provided between the gate 24 and the register 25, depending on the pulse position.

It is also possible for the circuit to be so modified that the kind of bits designated by the code words "1" to "7" are not as in the present example the ones of the scanning group but the bits identical to the first bit of the group. The number of the code word will then state the bit after which the change of the scanning result took place.

If the number *p* of the scanning cycles per group is made equal to 2, the circuit will be substantially simplified in that the counter 3 and 23 is reduced to two flip-flops each, the counters 31 and the comparator circuit 33 may be omitted but the number of bits to be transmitted per scanning cycle will be twice as high as in the example considered hereinabove and relating to one bit per scanning cycle instead of one bit for every two scanning cycles; those properties of the transmission code which are advantageous relative to direct transmission of the scanning bit will however remain.

It is clear to the expert that the same method may be performed with a wide variety of other circuits. It is possible for logic circuit elements to be employed other than those described hereinabove, it is possible for amplifiers to be included and the code converter circuits may be subdivided differently between the channel units and the central units and it is possible for the input code, bus bar code and transmission code to be related differently to each other without departing from the basic idea of the method.

We claim:

1. A method for transmitting binary asynchronous signals via a synchronous channel, comprising scanning the signals at regular intervals and obtaining as the result of each scanning operation either 1 or 0, combining every *p* successive scanning results of the same signal to form a scanning group comprising *p* bits, *p* being less than the number of scanning operations per signal element of the asynchronous signal, code converting each scanning group into one of *p*+1 code words each related to one of the *p* +1 possible scanning groups and being dependent solely on the first element of the scanning group and on the number of elements of a specific kind occurring within said scanning group, transmitting the data contained in the code word via a synchronous channel, receiving the transmitted data and converting the received synchronous signal into a binary time-quantitized output signal, succeeding $p$ intervals corresponding to each code word, and, with the exception of the distortion caused by time-quantitization and transmission errors, the output signal corresponding to the input signal during the $p$ intervals.

2. A circuit for transmitting binary asynchronous signals via at least one synchronous telegraph channel comprising a transmitter portion and a receiver portion, said transmitter portion provided with a master clock which transmits different pulse series for controlling scanning and transmission, said telegraph channel being provided with a channel unit having means for scanning the telegraph signal and for storing the number of scanning results of a specific kind during one scanning period, code converters being provided for converting said number of scanning results into an associated code word which is suitable for transmission, means for transmitting the code words, said receiver portion comprising a clock, which is synchronized to the transmitter frequency, a register which is controlled by said clock and adapted to store one code word, one counter which is indexed by said clock and one comparator delivering an output signal when the counter is in the position corresponding to the stored code word, a flip-flop delivering the output signal and, at the beginning of the time interval corresponding to the scanning period, is set to 1 or reset to 0 by a code word corresponding to the scanning result "only zeros" or "only ones" respectively and being switched by the output signal of the comparator.

* * * * *